United States Patent
Keusch

(10) Patent No.: US 7,171,872 B1
(45) Date of Patent: Feb. 6, 2007

(54) ADJUSTABLE MECHANICAL SCREWDRIVER

(76) Inventor: Siegfried Keusch, Zehntstr. 30, D-73779 Deizisau (DE)

( * ) Notice: Subject to any disclaimer, the term of this patent is extended or adjusted under 35 U.S.C. 154(b) by 0 days.

(21) Appl. No.: 11/366,158

(22) Filed: Mar. 2, 2006

(30) Foreign Application Priority Data

Nov. 12, 2005 (DE) .................. 10 2005 054 046

(51) Int. Cl.
- *B25B 17/00* (2006.01)
- *F16H 1/14* (2006.01)
- *F16H 1/20* (2006.01)

(52) U.S. Cl. .................. 81/57.26; 81/57.31; 81/57.11; 74/417

(58) Field of Classification Search ............... 81/57.26, 81/57.31, 57.11; 74/417, 425
See application file for complete search history.

(56) References Cited

U.S. PATENT DOCUMENTS

| | | | |
|---|---|---|---|
| 2,791,142 A | | 5/1957 | Lyon |
| 4,913,007 A | * | 4/1990 | Reynolds ................. 81/57.29 |
| 4,970,918 A | * | 11/1990 | Brewer et al. ............ 81/57.29 |
| 5,149,230 A | * | 9/1992 | Nett ......................... 408/42 |
| 6,009,776 A | * | 1/2000 | Warren ..................... 81/57.29 |
| 6,311,538 B1 | * | 11/2001 | Martin ....................... 73/1.04 |

FOREIGN PATENT DOCUMENTS

DE     103 18 563 A1     3/2004

* cited by examiner

*Primary Examiner*—Lee D. Wilson
*Assistant Examiner*—Alvin J. Grant
(74) *Attorney, Agent, or Firm*—Pauley Petersen & Erickson

(57) ABSTRACT

An adjustable mechanical screwdriver, having a receiving housing, gear housing and a deflection bevel gear. A small structural size is achieved because the driveshaft protrudes with a bearing shoulder at the drive bevel gear in a direction of the bearing shaft, which is inserted into and rotatably seated in a bearing bore of the bearing shaft. The gear housing having the deflection bevel gear and the power take-off shaft with the power take-off bevel gear is pivotable on the bearing shaft. The receiving housing receives the bearing shaft so that it cannot be rotated.

20 Claims, 3 Drawing Sheets

ADJUSTABLE MECHANICAL SCREWDRIVER

BACKGROUND OF THE INVENTION

1. Field of the Invention

This invention relates to an adjustable mechanical screwdriver with a driveshaft which can be set into rotating movement, and with a power take-off shaft which can be driven via a deflection bevel gear, wherein both shafts are connected, fixed against relative rotation, with a bevel gear, wherein the bevel gears are in operative connection with the deflection bevel gear, the driveshaft is rotatably seated in a receiving housing, and the power take-off shaft is rotatably seated in a gear housing, both pivotable with respect to each other from a distended position over a pivot angle of at least 90°, the deflection bevel gear is rotatably seated on a bearing shaft and is used as a pivot shaft of the gear housing on the receiving housing, and the bearing shaft is embodied as a clamping device, by which the set pivot position can be fixed in place.

2. Discussion of Related Art

An adjustable mechanical screw driver is known from German Patent Reference DE 103 18 563 A1. To reduce costs, only a single deflection bevel gear is used, which engages with the drive bevel gear, as well as with the power take-off bevel gear.

In comparison with an adjustable socket wrench known from U.S. Pat. No. 2,791,142, this has an advantage to keep the space requirements, and therefore the structural size, smaller in the area of the gear housing. But with this, the seating of the driveshaft with the drive bevel gear becomes worse in the area of the gear housing. Therefore, two deflection bevel gears are used in connection with the adjustable socket wrench taught by U.S. Pat. No. 2,791,142, which enclose the drive bevel gear, as well as the power take-off bevel gear, on both sides and engage with them.

But not only the cost outlay for the gear is increased with this, the structural size is increased, particularly in the area of the gear housing, which has disadvantages when using the adjustable mechanical screwdriver in small, narrowly restricted assembly areas.

SUMMARY OF THE INVENTION

It is one object of this invention to provide an adjustable mechanical screwdriver of the type mentioned above but so that, while keeping the cost outlay limited to the deflection bevel gear with the advantage of a lesser structural size in the area of the gear housing, the seating of the driveshaft with the drive bevel gear is simply improved.

In accordance with this invention, the above object is accomplished with the driveshaft that protrudes with a bearing shoulder at the drive bevel gear in the direction of the bearing shaft, which is inserted into and rotatably seated in a bearing bore of the bearing shaft. The gear housing, having the deflection bevel gear and the power take-off shaft with the power take-off bevel gear, is pivotable on the bearing shaft. The receiving housing receives the bearing shaft so that it cannot be rotated.

With this embodiment of the driveshaft, an additional seating of the driveshaft with the drive bevel gear is achieved in the gear housing without an increase in parts, wherein use is made of the bearing shaft which is seated, fixed against relative rotation, in the receiving housing.

Thus, it is possible to keep the structural size of the gear housing and the receiving housing small in the axial direction of the bearing shaft.

Thus, it is possible to increase the pivotability of the driveshaft in the bearing shaft because the bearing shoulder of the driveshaft is introduced into a bearing journal inserted into the bearing bore of the bearing shaft.

Mounting of the adjustable mechanical screwdriver is made easier and simplified if the gear housing, together with the bearing shaft, the deflection bevel gear, the power take-off shaft with the power take-off bevel gear and the drive bevel gear, form a unit which can be prefabricated and which can be installed in a two-part receiving housing, wherein at least one end of the bearing shaft protruding from the unit has a fastening section which can be secured in place, fixed against relative rotation, in a fastening receiver of the matched receiving housing. The driveshaft can be introduced into the unit via an insertion opening of the gear housing, and can be connected with the drive bevel gear and the bearing shaft.

Then the prefabricated unit can be easily installed in the two-part receiving housing. In accordance with a further embodiment, the bearing shaft is used as a clamping device in that both ends of the bearing shaft protrude with threaded elements from the receiving housing. Toggle heads with inserted nuts can be placed on these threaded elements, and thus the housing elements of the receiving housing can be clamped with the housing shells of the gear housing. The set pivot position of the gear housing can be fixed in place with positive contact on the receiving housing.

The connection of the two housing elements of the receiving housing and the two housing shells of the gear housing is achieved if the plane of separation of the housing elements of the receiving housing extends through the axis of rotation of the driveshaft and extends perpendicularly with respect to the bearing shaft. The plane of separation of the housing shells of the gear housing extends through the axis of rotation of the power take-off shaft and extended perpendicularly with respect to the bearing shaft. The housing elements are connected with each other by screw connections.

With the rotary seating of the driveshaft in the gear housing, the power take-off shaft is rotatably seated by a sliding bearing in a shoulder of the housing shells of the gear housing. The shoulders of the housing shells are additionally kept together by a fastening ring.

Also, for receiving different tool bits, the end of the power take-off shaft protruding from the shoulders of the housing shells of the gear housing are designed as bit receptacles with an inserted permanent magnet.

The pivotability of the deflection bevel gear on the bearing shaft while maintaining the axial position is achieved if the deflection bevel gear is supported by an axial ball bearing on the inside of the facing housing shell of the gear housing.

Thus, it is possible to keep the cost outlay and space requirements of this bearing low if the ball bearing is formed from a bearing race, which can be fastened to the housing shell, and balls in a ball bearing cage, cut into an annular groove of the deflection bevel gear.

Screwing the toggle heads to the threaded elements of the bearing shaft is improved if the nuts are held, fixed against relative rotation, in a receptacle of the toggle heads. The receptacles are closed off by cover elements. The cover elements close off the screw points.

Driving of the adjustable mechanical screwdriver can occur if the receiving housing forms, adjoining the end of the driveshaft, a receiver for a commercially available rod mechanical screwdriver, which is coupled by its bit receiver with an outer hexagon nut of the driveshaft, or if the receiving housing is embodied as a motor housing adjoining the end of the driveshaft, which receives a stator and rotor with a motor shaft. The motor shaft is used as driveshaft, or is firmly connected with it, fixed against relative rotation.

BRIEF DESCRIPTION OF THE DRAWINGS

This invention is explained in greater detail in view of an exemplary embodiment represented in the drawings, wherein.

DESCRIPTION OF THE PREFERRED EMBODIMENT

Figure 1:
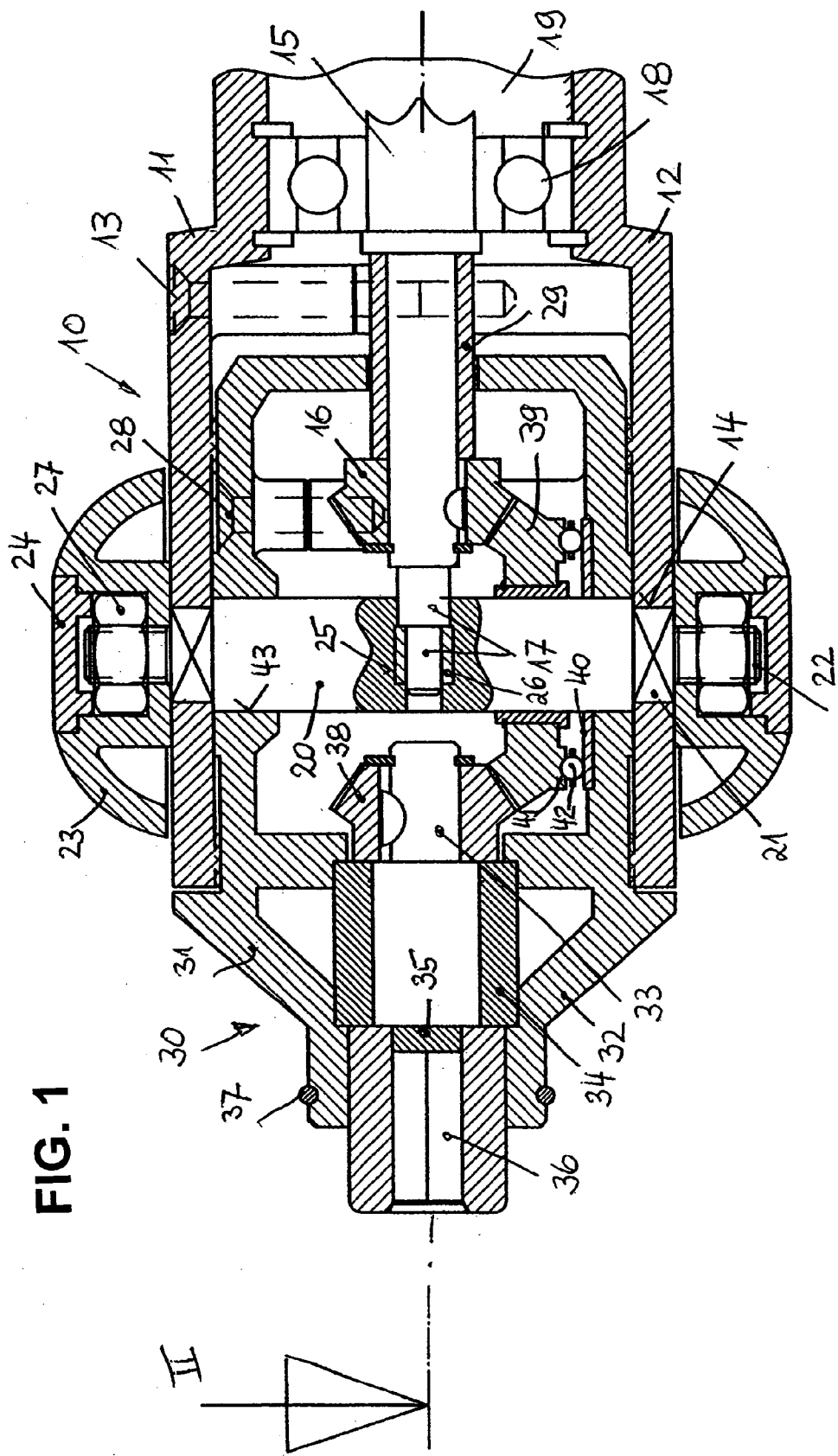
FIG. 1 is a longitudinal section view taken through an adjustable mechanical screwdriver in an area of a receiving housing and a gear housing, which is in an extended position.

As FIG. 1 shows, the receiving housing 10 comprises the two housing elements 11 and 12, which are connected with each other by screw connections 13. The plane of separation extends in the axis of rotation of the driveshaft 15 and extends perpendicularly with respect to the bearing shaft 20, which is seated, fixed against relative rotation, in fixation sections 21 in the fastening receiver 14 of the housing elements 11 and 12. The driveshaft 15 is seated in the receiving housing 10 by ball bearings 18, and is inserted into the gear housing 30, which is put together from the two housing shells 31 and 32. The drive bevel gear 16 is maintained, fixed against relative rotation, at the end of the driveshaft 15. The drive bevel gear 16 is axially supported via a spacer 29 in the area of the ball bearing 18. Adjoining the driveshaft 15, the receiving housing 10 forms a receptacle 19 for a commercially available mechanical rod screwdriver, or receives a motor having a stator and a rotor, wherein the motor shaft of the rotor can form the driveshaft 15, or can be fixedly connected with the driveshaft 15. The coupling of the driveshaft 15 can also take place via an outer hexagon nut and a bit receiver. The driveshaft 15 is extended in the form of a bearing shoulder 17 in the direction of the bearing shaft 20 seated in the gear housing 30. The bearing shoulder 17 is introduced into a bearing bushing 26 and is rotatably seated. The bearing bushing 26 is inserted into a bearing bore 25 of the bearing shaft 20.

A deflection bevel gear 39 is seated, freely rotatable, on the bearing shaft 20, and is in engagement with the drive bevel gear 16 of the driveshaft 15 and the power take-off bevel gear 38 of the power take-off shaft 33. The power take-off shaft 33 is seated in the gear housing 30 assembled from the two housing shells 31 and 32. As the screw connections 28 show, the plane of separation in this case extends through the rotary shaft of the power take-off shaft 33 and extends perpendicularly with respect to the bearing shaft 20. The bearing bores 43 in the housing shells 31 and 32 receive the bearing shaft 20 so it can rotate freely. The deflection bevel gear 39 is supported via an axial ball bearing on the facing inside of the housing shell 32. In this case a bearing ring 40 is arranged around and/or cut into the bearing shaft 20 in the housing shell 32 and is fixed in place.

The facing side of the deflection bevel gear 39 supports an annular groove 41 with a ball bearing cage 42 inserted, and the axial ball bearing is so complete.

The power take-off shaft 33 is seated by a sliding bearing 34 in the assembled gear housing 30 with the housing elements 31 and 32, wherein screw connections 28 provide the connection.

The power take-off shaft 33 is extended through a shoulder of the gear housing 30 and protrudes from the gear housing 30 with one end, which is designed as a bit receiver 36. The shoulder elements of the housing shells 31 and 32 are also kept together by a fastening ring 37.

Figure 2:
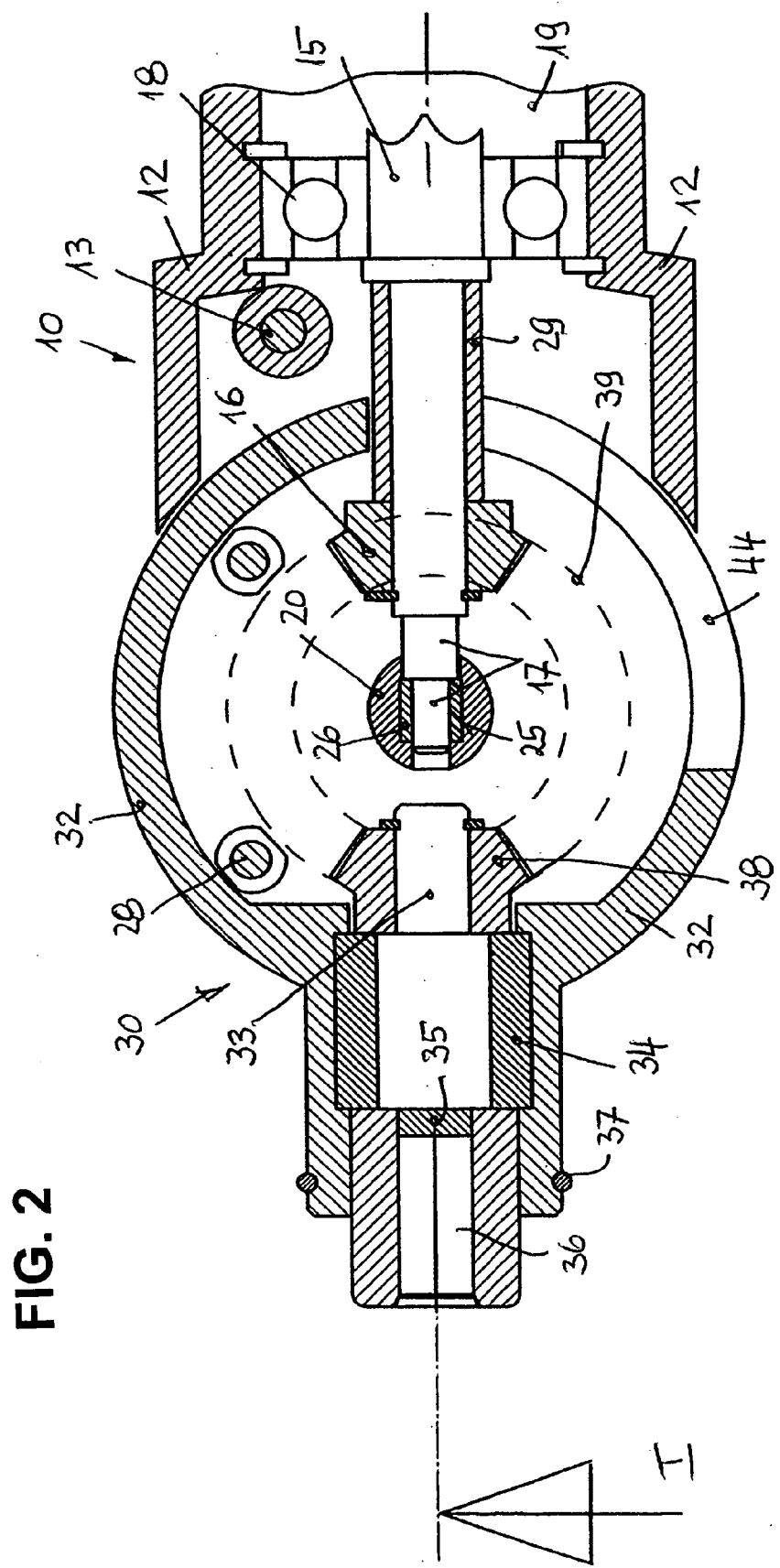
FIG. 2 is a view of the longitudinal section in accordance with FIG. 1, rotated by 90° in the direction II.

As the sectional view in FIG. 2 shows, the insertion opening 44 can be seen in the sectional view rotated by 90°, with respect to FIG. 1, through which the driveshaft 15 with the bearing shoulder 17 can be introduced into the prefabricated unit of the gear housing 30 with the power take-off shaft 33, the power take-off bevel gear 38, the bearing shaft 20 and the drive bevel gear 16 and also can be connected with the bearing shaft 20 and the drive bevel gear 16.

Figure 3:
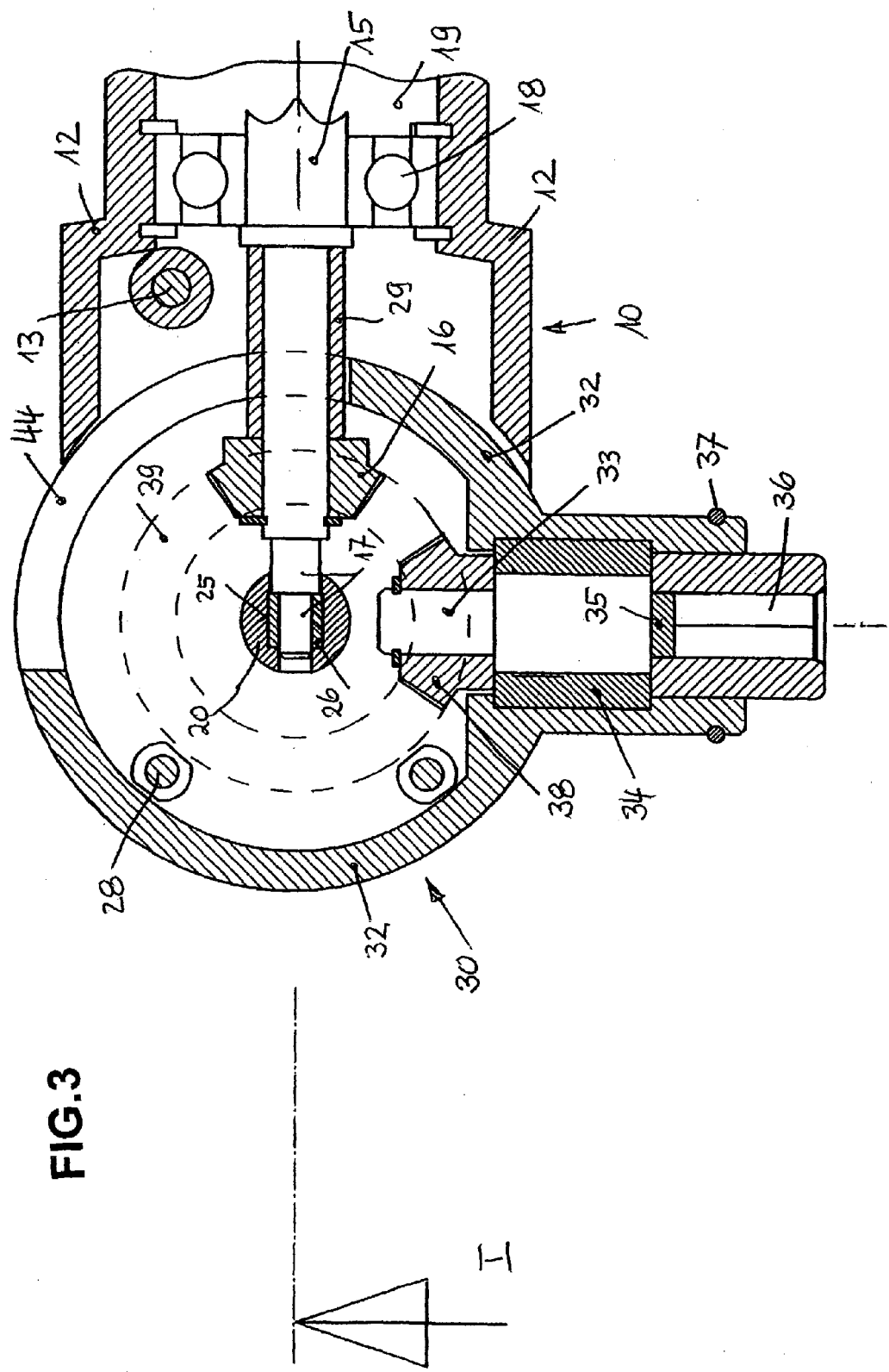
FIG. 3 is the longitudinal section corresponding to FIG. 2 in a position, pivoted by 90°, of the gear housing at the receiving housing.

Also, the insertion opening 44 permits the pivoting of the gear housing 30 by 90°, as the sectional view in FIG. 3 shows, with respect to FIG. 2.

FIGS. 2 and 3 show that the housing shells 31 and 32 in particular of the gear housing 30 determine the structural size of the adjustable mechanical screwdriver in this area.

A permanent magnet 35 is inserted into the part of the power take-off shaft 33 protruding from the shoulder of the gear housing 30 and embodied as bit receiver 36 for holding the insertable tool bit.

German Patent Reference 10 2005 054 046.5, the priority document corresponding to this invention, and its teachings are incorporated, by reference, into this specification.

I claim:

1. An adjustable mechanical screwdriver with a driveshaft (15) which can be set into a rotating movement, with a power take-off shaft (33) which can be driven via a deflection bevel gear (39), wherein both shafts are connected and fixed against relative rotation, with a bevel gear, wherein the bevel gear is in operative connection with a deflection bevel gear, the driveshaft (15) is rotatably seated in a receiving housing (10), the power take-off shaft (33) is rotatably seated in a gear housing (30) and both are pivotable with respect to each other from a distended position over a pivot angle of at least 90°, wherein the deflection bevel gear (39) is rotatably seated on a bearing shaft (20) used as a pivot shaft of the gear housing (30) on the receiving housing (10), wherein the bearing shaft (20) is formed as a clamping device, by which the set pivot position can be fixed in place, the adjustable mechanical screwdriver comprising:

the driveshaft (15) protruding with a bearing shoulder (17) at the drive bevel gear (16) in a direction of the bearing shaft (20), which is inserted into and rotatably seated in a bearing bore (25) of the bearing shaft (20);

the gear housing (30) having the deflection bevel gear (39) and the power take-off shaft (33) with the power take-off bevel gear (38) and being pivotable on the bearing shaft (20); and the receiving housing (10) receiving and preventing the bearing shaft (20) from rotation.

2. The adjustable mechanical screwdriver in accordance with claim 1, wherein the bearing shoulder (17) of the driveshaft (15) is introduced into a bearing journal (26) which is inserted into the bearing bore (25) of the bearing shaft (20).

3. The adjustable mechanical screwdriver in accordance with claim 2, wherein the gear housing (30) with the bearing shaft (20), the deflection bevel gear (39), the power take-off shaft (33) with the power take-off bevel gear (38) and the drive bevel gear (16), form a unit which can be prefabricated and which can be installed in a two-part receiving housing (10, 11, 12), wherein at least one end of the bearing shaft (20) protruding from the unit has a fastening section (21) which can be secured in place and fixed against relative rotation in a fastening receiver (14) of the matched receiving housing (10), and the driveshaft (20) can be introduced into the unit via an insertion opening (44) of the gear housing (30) and can be connected with the drive bevel gear (16) and the bearing shaft (20).

4. The adjustable mechanical screwdriver in accordance with claim 3, wherein both ends of the bearing shaft (20) protrude with threaded elements (22) from the receiving housing (10), toggle heads (23) with inserted nuts (27) can be placed on the threaded elements (22), and the housing elements (11, 12) of the receiving housing (10) are clamped with the housing shells (31, 32) of the gear housing (30) in a positively connected manner, and a set pivot position of the gear housing (30) can be fixed in place on the receiving housing (10).

5. The adjustable mechanical screwdriver in accordance with claim 4, wherein a plane of separation of the housing elements (11, 12) of the receiving housing (10) extends through the axis of rotation of the driveshaft (15) and extends perpendicularly with respect to the bearing shaft (20), the plane of separation of the housing shells (31, 32) of the gear housing (30) extends through an axis of rotation of the power take-off shaft (33) and extend perpendicularly with respect to the bearing shaft (20), and the housing elements (11, 12) are connected with each other by screw connections (13, 28).

6. The adjustable mechanical screwdriver in accordance with claim 5, wherein the power take-off shaft (33) is rotatably seated by a sliding bearing (34) in a shoulder of the housing shells (31, 32) of the gear housing (30), and the shoulders of the housing shells (31, 32) are kept together by a fastening ring (37).

7. The adjustable mechanical screwdriver in accordance with claim 6, wherein an end of the power take-off shaft (33) protruding from the shoulders of the housing shells (31, 32) of the gear housing (30) is designed as a bit receptacle (36) with an inserted permanent magnet (35).

8. The adjustable mechanical screwdriver in accordance with claim 7, wherein the deflection bevel gear (39) is supported by an axial ball bearing on an inside of the facing housing shell (32) of the gear housing (30).

9. The adjustable mechanical screwdriver in accordance with claim 8, wherein the ball bearing is formed from a bearing race (40) which can be fastened to the housing shell (32), and of a ball bearing cage (42) cut into an annular groove (41) of the deflection bevel gear (39), the nuts are held, fixed against relative rotation, in a receptacle of the toggle heads, and the receptacles are closed by cover elements.

10. The adjustable mechanical screwdriver in accordance with claim 4, wherein the nuts (27) are held, fixed against relative rotation, in a receptacle of the toggle heads (23), and the receptacles are closed by cover elements (24).

11. The adjustable mechanical screwdriver in accordance with claim 10, wherein the receiving housing (10) forms adjoining an end of the driveshaft (15), a receiver (19) for a rod mechanical screwdriver coupled by a bit receiver with an outer hexagon nut of the driveshaft (15).

12. The adjustable mechanical screwdriver in accordance with claim 10, wherein the receiving housing (10) is formed as a motor housing adjoining the end of the driveshaft (15) which receives a stator and a rotor with a motor shaft, and the motor shaft is one of used as the driveshaft (15) and firmly connected with the driveshaft (15), and is fixed against relative rotation.

13. The adjustable mechanical screwdriver in accordance with claim 1, wherein the gear housing (30) with the bearing shaft (20), the deflection bevel gear (39), the power take-off shaft (33) with the power take-off bevel gear (38) and the drive bevel gear (16), form a unit which can be prefabricated and which can be installed in a two-part receiving housing (10, 11, 12), wherein at least one end of the bearing shaft (20) protruding from the unit has a fastening section (21) which can be secured in place and fixed against relative rotation in a fastening receiver (14) of the matched receiving housing (10), and the driveshaft (20) can be introduced into the unit via an insertion opening (44) of the gear housing (30) and can be connected with the drive bevel gear (16) and the bearing shaft (20).

14. The adjustable mechanical screwdriver in accordance with claim 1, wherein both ends of the bearing shaft (20) protrude with threaded elements (22) from the receiving housing (10), toggle heads (23) with inserted nuts (27) can be placed on the threaded elements (22), and the housing elements (11, 12) of the receiving housing (10) are clamped with the housing shells (31, 32) of the gear housing (30) in a positively connected manner, and a set pivot position of the gear housing (30) can be fixed in place on the receiving housing (10).

15. The adjustable mechanical screwdriver in accordance with claim 14, wherein a plane of separation of the housing elements (11, 12) of the receiving housing (10) extends through the axis of rotation of the driveshaft (15) and extends perpendicularly with respect to the bearing shaft (20), the plane of separation of the housing shells (31, 32) of the gear housing (30) extends through an axis of rotation of the power take-off shaft (33) and extend perpendicularly with respect to the bearing shaft (20), and the housing elements (11, 12) are connected with each other by screw connections (13, 28).

16. The adjustable mechanical screwdriver in accordance with claim 5, wherein an end of the power take-off shaft (33) protruding from the shoulders of the housing shells (31, 32) of the gear housing (30) is designed as a bit receptacle (36) with an inserted permanent magnet (35).

17. The adjustable mechanical screwdriver in accordance with claim 1, wherein the deflection bevel gear (39) is supported by an axial ball bearing on an inside of the facing housing shell (32) of the gear housing (30).

18. The adjustable mechanical screwdriver in accordance with claim 17, wherein the ball bearing is formed from a bearing race (40) which can be fastened to the housing shell (32), and of a ball bearing cage (42) cut into an annular groove (41) of the deflection bevel gear (39), the nuts are held, fixed against relative rotation, in a receptacle of the toggle heads, and the receptacles are closed by cover elements.

19. The adjustable mechanical screwdriver in accordance with claim 1, wherein the receiving housing (10) forms adjoining an end of the driveshaft (15), a receiver (19) for a rod mechanical screwdriver coupled by a bit receiver with an outer hexagon nut of the driveshaft (15).

20. The adjustable mechanical screwdriver in accordance with claim 1, wherein the receiving housing (10) is formed as a motor housing adjoining the end of the driveshaft (15) which receives a stator and a rotor with a motor shaft, and the motor shaft is one of used as the driveshaft (15) and firmly connected with the driveshaft (15), and is fixed against relative rotation.

* * * * *